United States Patent
Ford et al.

(10) Patent No.: US 6,647,010 B1
(45) Date of Patent: Nov. 11, 2003

(54) OPTOELECTRONIC NETWORK INTERFACE DEVICE

(75) Inventors: Joseph Earl Ford, Oakhurst, NJ (US); Ashok V. Krishnamoorthy, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/287,533

(22) Filed: Apr. 7, 1999

(51) Int. Cl.[7] .............................................. H04L 12/28
(52) U.S. Cl. ..................... 370/391; 370/398; 370/384
(58) Field of Search ................................. 370/389, 391, 370/392, 395.1, 398, 395.5, 419, 535, 536, 384; 359/118, 127, 139, 152, 117, 120

(56) References Cited

U.S. PATENT DOCUMENTS

| | | | |
|---|---|---|---|
| 4,873,681 A | * 10/1989 | Arthurs et al. | 359/121 |
| 5,541,914 A | * 7/1996 | Krishnamoorthy et al. | 359/117 |
| 5,594,576 A | * 1/1997 | Sutherland et al. | 359/118 |
| 5,912,751 A | * 6/1999 | Ford et al. | 359/117 |
| 6,002,692 A | * 12/1999 | Wills | 370/401 |
| 6,058,112 A | * 5/2000 | Kerstein et al. | 370/389 |

OTHER PUBLICATIONS

T. K. Woodward et al, "Optical Receivers for Optoelectronic VLSI", IEEE Journal of Selected Topics in Quantum Electronics, vol. 2, No. 1, Apr. 1996, pp. 106–116.

K. W. Goossen et al. "GaAs MQW Modulators Integrated with Silicon CMOS", IEEE Photonics Technology Letters, vol. 7, No. 4, Apr. 1995, pp. 360–362.

Wieland et al, "Optical Receiver Array In Silicon Bipolar Technology With Self–Aligned, Low Parasitic III/V Detectors for DC–1 Gbit/s Parallel Links", Electronic Letters, vol. 27, 1991, p. 221.

A. V. Kirshnamoorthy et al, "3–D Integration of MQW Modulators Over Active Submicron CMOS Circuits: 375 Mb/s Transimpedance Receiver–Transmitter Circuit", IEEE Photonics Technology Letters, vol. 7, No. 11, Nov. 1995, pp. 1288–1290.

\* cited by examiner

*Primary Examiner*—Wellington Chin
*Assistant Examiner*—William Schultz

(57) ABSTRACT

Method and apparatus are disclosed for an optoelectronic network interface device allowing reconfiguration of ports in a Local Area Network (LAN). More particularly, the optoelectronic interface device is integrated to include optical ports for communicating with a network, electronic circuits for providing an interface to end-users and a controllable electronic switch between the optical ports and electronic circuits. In response to a control signal, the switch dynamically reconfigures the connection between selected optical ports and selected electronic circuits.

12 Claims, 3 Drawing Sheets

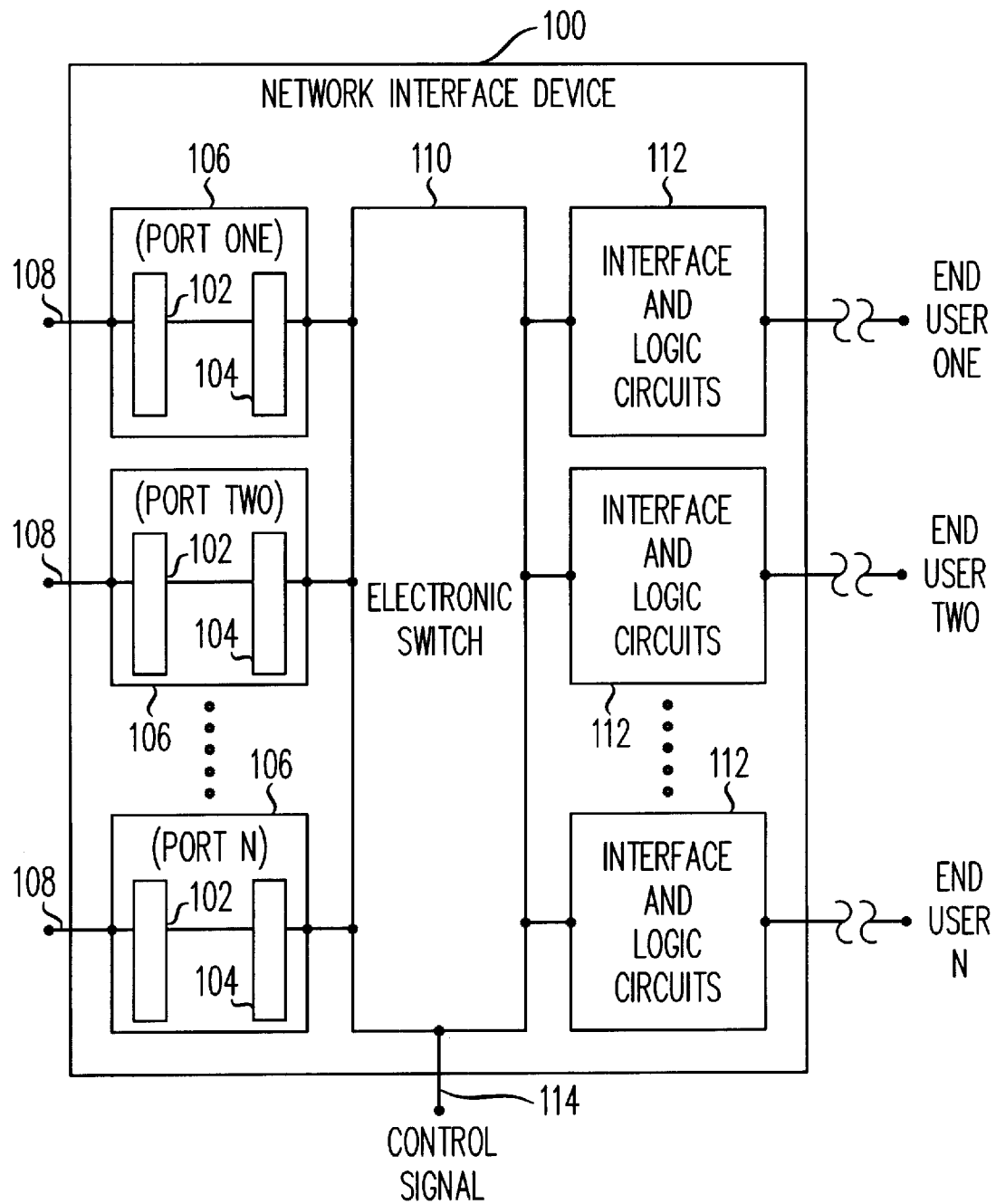

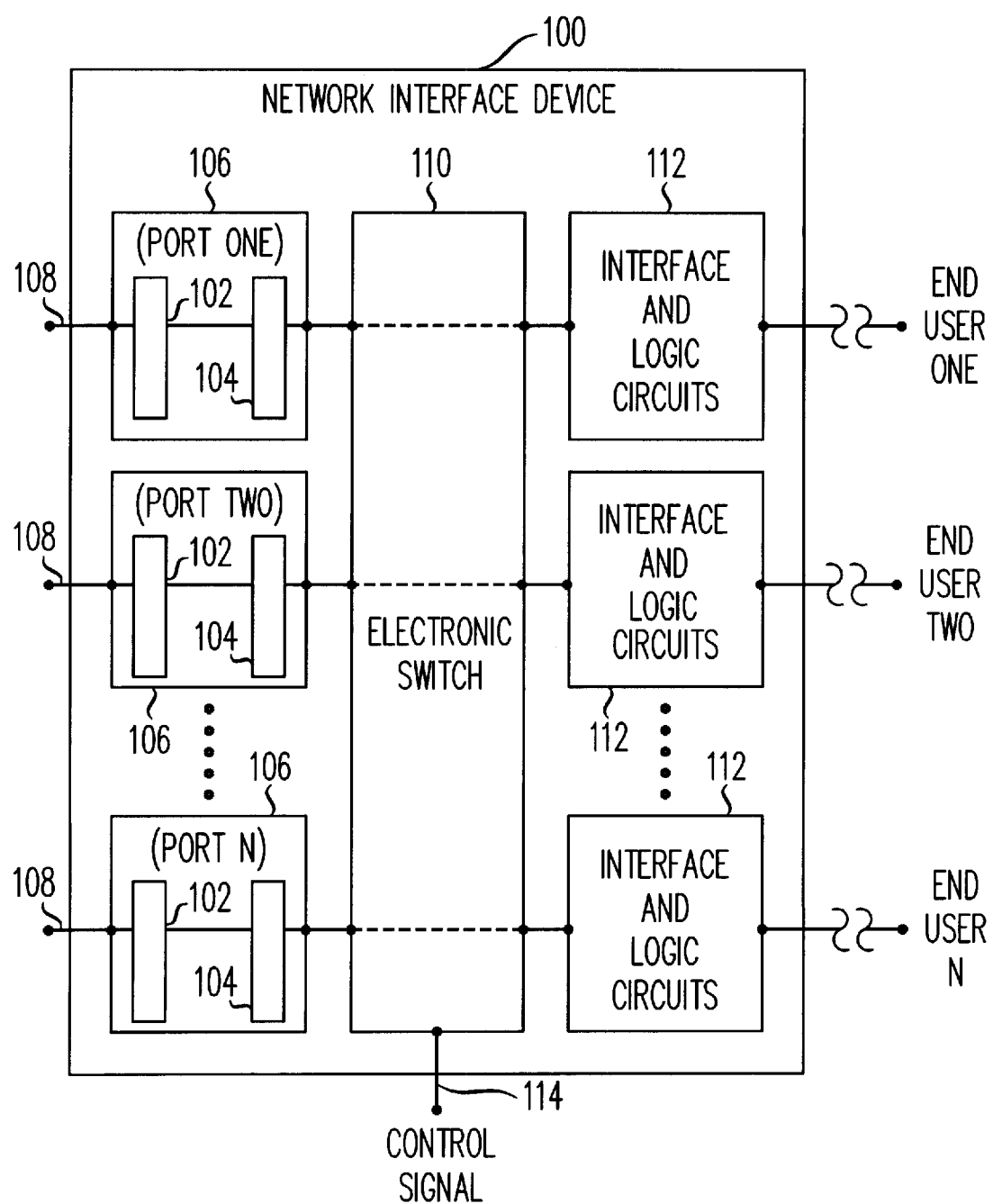

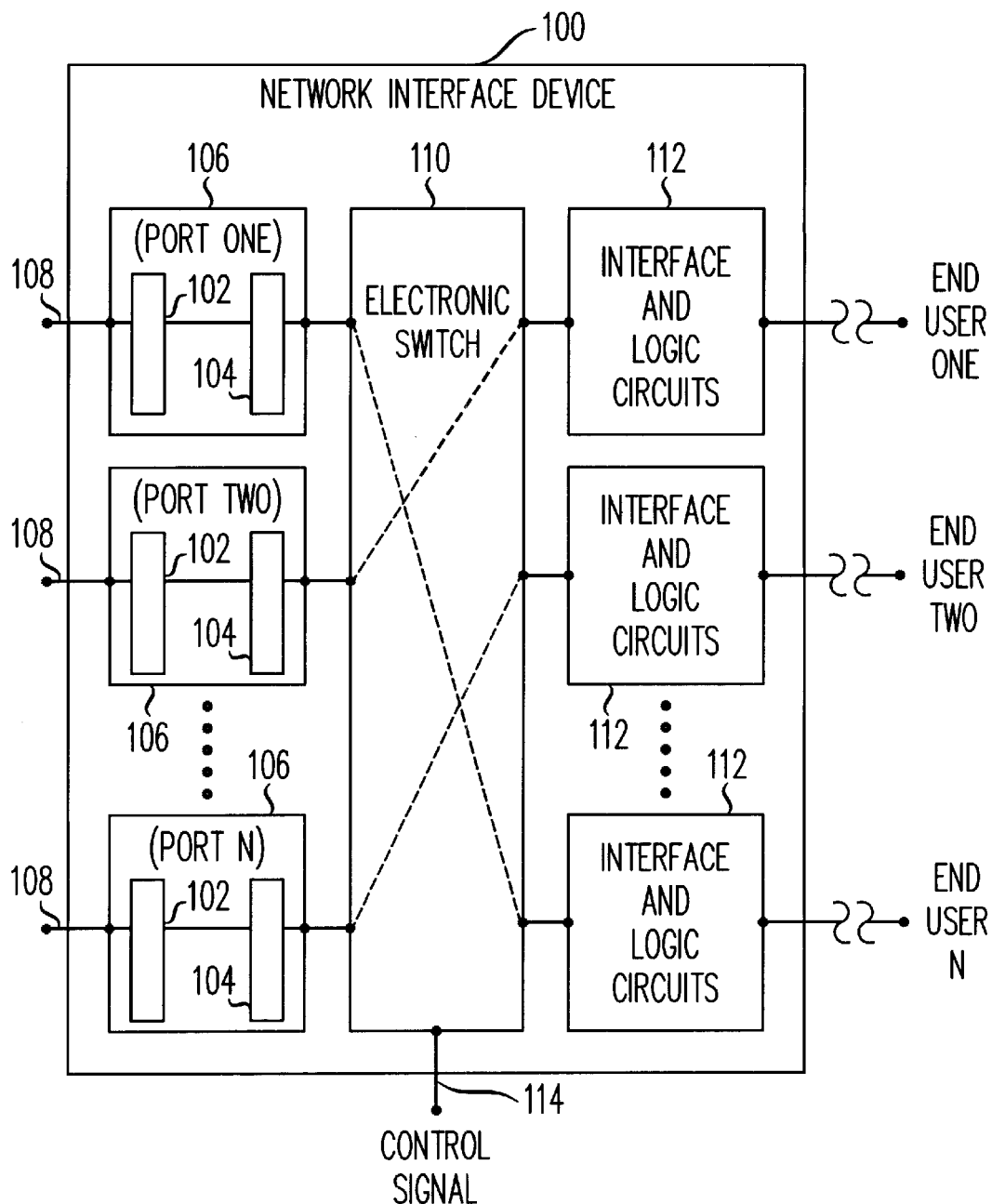

OPTOELECTRONIC NETWORK INTERFACE DEVICE

FIELD OF THE INVENTION

This invention relates to a network interface device and, more particularly, to a dynamically reconfigurable optoelectronic network interface device.

BACKGROUND OF THE INVENTION

In communication networks, such as a Local Area Network (LAN), the capability of reconfiguring the ports of a network interface device is essential for accommodating the changing needs of end-users. Specifically, this necessitates dynamic reconfigurability of the ports of a network interface device while the device is in operation within the communication network.

Conventional network interface devices using optoelectronic circuits are known and used in a number of important communication system applications, including Local Area Networks (LANs). A typical LAN interface device has multiple ports that are designed for use with different data rates corresponding to the data rates used in the communication network. For example, the interface device may have a large number of 100 Megabits/s ports and several 1 Gigabit/s ports. The interface device ports are configured according to the initial requirements, such as bandwidth needs, of end-users in the network. Although, reconfiguration of the end-user interface ports in such a communication network is possible, it none-the-less presents several significant limitations.

When used in a communication network that is operational, reconfiguration of the interface ports must be performed on the network side (e.g. in the communication network infrastructure) of the LAN interface device connection. This is usually accomplished by placing several manually reconfigurable optical patch panels with jumper fibers or an expensive optical switch in the wiring infrastructure. Subsequently, port and network modifications can be made by appropriate changes in the optical patch panels or optical switch. Since these methods of reconfiguration are generally costly and/or time consuming, they are prohibitive to the dynamic reconfiguration of network interface ports in response to the changing communication needs of end-users. Thus, opportunity exists to employ a more effective and less costly means to achieve reconfigurability in communication networks.

SUMMARY OF THE INVENTION

In accordance with the principles of the present invention, rapid port reconfigurability is achieved in a communication network by utilizing an optoelectronic interface device with an integrated electronic switch between the ports and the remaining electronic circuits. As a result of this design, the interface device's port connections to the network can be dynamically altered without disturbing physical connections to end-users.

In accordance with one aspect of the invention, dynamic port reconfiguration is enabled with a controllable electronic switch integrated into the optoelectronic interface device. Consequently, additional and costly optical switching elements to provide port reconfigurability are not required in the communication network. As a result of a unique configuration design and the use of a conventional controller to provide a control signal for reconfiguring the electronic switch, the present invention's network interface device provides dynamic reconfiguration of ports while supporting different signal bandwidths or data-rates at each of the ports. Thus, the network interface device supplies a means for dynamically allocating bandwidth according to an end-user's changing needs.

In accordance with another aspect of the invention, the optoelectronic interface device with an electronic switch is integrated onto a single optoelectronic Very Large Scale Integration (VLSI) chip. Therefore, a reduction in the cost of manufacturing is expected through the miniaturization and integration of a number of formerly discrete circuits.

BRIEF DESCRIPTION OF THE DRAWING

The invention will be more fully understood from the following detailed description of illustrative embodiments taken in connection with the appended figures in which:

FIG. 1 is a block diagram of an illustrative embodiment of the optoelectronic network interface device in accordance with the principles of the present invention;

FIGS. 2 and 3 show exemplary configurations of the electronic switch for the embodiment of FIG. 1.

DETAILED DESCRIPTION OF THE INVENTION

Communication networks require a method to reconfigure interface ports to end-users as the network needs of the end-users change or evolve with technology. The present invention is an optoelectronic network interface device having a controllable electronic switch that is well suited for such a reconfiguration application. The interface device is designed for use with multiple input fibers in a communication network in which each input fiber can support different data rates. Thus, the controllable electronic switch allows the interface device to provide a dynamic allocation of ports, while supporting different data rates at each of the ports. Although particularly well suited as a network interface for a LAN, the invention is not limited to use with any particular type of communication network.

According to the principles of the present invention, the integrated optoelectronic network interface device delivers the advantages of a multi-port conventional LAN interface with an electronic switch, while overcoming certain disadvantages of prior network interfaces. As used herein, the term "integrated" shall mean that the components recited are either integrated in a single monolithic chip or combined as a plurality of chips that are coupled together on a single circuit board. In general, the interface device is an integrated structure including at least one port, also known as an optoelectronic transceiver, to receive and send optical signals from and to input fibers. The ports also convert (1) optical signals to electrical signals and (2) electrical signals to optical signals. The ports are coupled to a controllable electronic switch for routing electrical signals. In turn, the electronic switch is coupled to a plurality of electronic circuits, for example, interface and logic circuits to receive and send electrical signals between the electronic switch and the corresponding end-users.

Port reconfiguration is accomplished by using the electronic switch to route the electronic signals to the appropriate electronic circuits and ultimately to the end-users. In other words, by controlling the electronic switch, the connection path between each port and the electronic circuits are established. Thus, the ports of the interface device are dynamically reconfigured with each cross-connect of the electronic switch. As a result, end-user bandwidth requirements are met without the need for disturbing physical connections or adding expensive optical circuits in the network infrastructure.

FIG. 1 shows one exemplary embodiment of the interface device, specifically, optoelectronic interface 100 includes interface ports 106. Each interface port 106 includes a laser/detector pair 102 coupled to Driver/receiver 104. The combination of laser/detector 102 and driver/receiver 104 is commonly known as an optoelectronic transceiver. The optoelectronic transceivers process optical signals and, in particular, transmit and receive signals to and from multiple input fiber pairs 108. In addition, the optoelectronic transceivers convert (1) optical signals to electrical signals and (2) electrical signals to optical signals. The signal data rates can differ, for example, 10 Megabits/s, 100 Megabits/s, and 1 Gigabit/s.

Although each input fiber-pair 108 is associated with a particular port 106, both ports 106 and fiber-pairs 108 are designed for use with multiple data rates, therefore, the ports and fiber-pairs are not dedicated to a specific data rate.

Electronic circuits 112, for example, interface and logic circuits, are also integrated into interface device 100. Electronic circuits 112 may include specific data-rate interface electronics as well as associated physical layer circuits, such as encoders/decoders, serializers-deserializers and Media-Access Control (MAC) layer circuits. Accordingly, specific physical layer circuits may correspond to various bit rates, such as 10 Megabits/s, 100 Megabits/s, and 1 Gigabit/s. Moreover, specific physical layer circuits may also be associated with various protocols, such as Ethernet, Fiber-channel, FDDI, ATM, and the like.

Coupled to drivers/receivers 104 and electronic circuits 112 is an electronic switch 110. Conventional electronic switches are also known in the art as a digital crossbar interconnection or electronic cross-connect. Such switches may be implemented, for example, by electronic circuitry and may incorporate such functionality as in the commercially available Lucent Technologies Digital Access Cross-Connect Switch (DACS) family of switches. However, unlike conventional electronic switches, electronic switch 110 is integrated into interface device 100, thereby forming this new combination.

Electronic switch 110 is coupled to electronic circuits 112, such that each electronic signal received from drivers/receivers 104 can be routed to any of the electronic circuits 112. Similarly, each electronic signal transmitted from the electronic circuits 112 can be routed to any of the drivers/receivers 104 through switch 110. A control signal is generated on lead 114, which is coupled to electronic switch 110 for the purpose of selecting the desired connection paths or routing positions in electronic switch 110 between ports 106 and electronic circuits 112. The control signal may be generated by any conventional control device or method including, but not limited to: 1) local control, such as a LAN administrator; 2) remote control, such as a network control center; or 3) automated through the use of dynamic network reconfiguration software. In this manner, a connection can be dynamically formed from any port 106 to any electronic circuit 112 by the electronic switch.

With continuing reference to FIG. 1, input fiber pairs 108 may comprise individual fibers or may be bundled in a fiber-ribbon. The use of a fiber-ribbon will decrease the required footprint of the fibers, as well as offer cost reduction and ease of assembly. Although fiber-ribbons are not as easily moved or reconfigured as individual fibers and, therefore, are less desirable in traditional LAN interface applications, the present invention's electronic reconfigurability, via the switch, overcomes this limitation.

Advantageously, a conventional feedback mechanism (not shown) can be incorporated into the optoelectronic interface 100 of FIG. 1 to optimize the optical transceivers according to various data rates received from fiber-pairs 108. Specifically, the optical transceiver optimization consists of adapting the bandwidth of the drivers/receivers 104 to correspond to the incoming optical signals from input fibers 108. In particular, the first stage of the detector and receiver, typically known as pre-amplifiers, have a bandwidth range that covers all of the bit-rates of the optical signals received from fiber-pairs 108, for example, 0.0 Hz through 1.25 GHz. Such receivers have been implemented in CMOS circuits as described in an article entitled "Optical Receivers for Optoelectronic VLSI," written by Woodward et al., which was published in IEEE Journal of Selected Topics in Quantum Electronics, Vol. 2, No. 1, April 1996.

In FIG. 2, network interface device 100 is configured to provide port connections to end-users, in which port one is connected to end-user and port two is connected to end-user two and so on. This port configuration may correspond to the initial needs of the end-users at the time the communication network was installed. In such a configuration port one may have a data rate of 10 Megabit/s, port two may have a data rate of 100 Megabits/s, and port N may have a data rate of 1 Gigabit/s.

When the bandwidth or data rate needs of the end-users change, the ports can be reconfigured by simply sending a control signal to electronic switch 110 to make the appropriate connections in interface device 100, thus, providing each end-user with a port connection corresponding to the new requirements. For example, end-user one can receive a greater bandwidth allocation by having electronic switch 110 form a cross-connect path from end-user one to port two, as shown in FIG. 3, thus providing end-user one with a 100 Megabits/s port. Similarly, the other ports in FIG. 3 are reconfigured, via electronic switch 110, to provide other end-users with a suitable port coterminous with the end-users' needs. Thus, the interface device's ports are not only dynamically reconfigured but also reconfigured without physical rewiring or optical circuits as in the prior art.

Significant improvements in reconfiguration time performance should be realized as a result of the integration of the optoelectronic interface and electronic switch into a single network interface device. Since the electronic switch is integrated into the network interface device, the network interface device provides the possibility of a reconfiguration time of ten nano-seconds or less due to cross-connecting (switching) electronic signals instead of optical signals. This is a substantial improvement over the optical circuit switching method described above, which may require a reconfiguration time of ten milli-seconds or more.

In another embodiment of the invention, the optoelectronic interface can be integrated onto a single monolithic chip, to form an optoelectronic-VLSI (OE-VLSI) interface chip. Such an OE-VLSI interface chip includes all of the elements shown in FIG. 1 and described above. In addition, the interface chip includes a housing (not shown) that contains contact members to provide external access to the internal components of the interface chip for receiving control signals and the like. As a result of this chip integration, and in addition to the advantages described above, we expect the cost of manufacturing the optoelectronic interface will be reduced through the miniaturization and integration of a number of formerly discrete circuits.

The OE-VLSI interface chip can be manufactured with the use of flip-chip bonding technology. Specifically, flip-chip bonding can be used to integrate the optoelectronic and electronic interface devices, as well as the electronic switch, into a single high-density optoelectronic VLSI logic integrated circuit chip.

By way of example, flip-chip bonding has been used to integrate high density CMOS electronics and high performance GaAs-based optoelectronics into OE-VLSI circuits, as further described in an article entitled "GaAs MQW modulators integrated with silicon CMOS," written by Goossen et al., published in IEEE Photonics Technology Letters, Vol. 7, No. 4, pp. 360–60, April 1995; and an article entitled "Optical Receiver Array In Silicon Bipolar Technology With Self-Aligned, Low Parasitic III/V Detectors For DC-1 Gbit/S Parallel Links," written by Wieland, et al., published in Electronic Letters, Vol. 27, p. 221, 1991. Again by way of example, flip-chip bonding has been used for a fully three-dimensional dense optoelectronic-VLSI integration, with accurate alignment between the optical devices and the VLSI circuits, as described in an article entitled "3-D integration of MQW modulators over active sub-micron CMOS circuits: 375 Mb/s transimpedance receiver-transmitter circuit," written by Krishnamoorthy et al., published in IEEE Photonics Technology Letters, Vol. 7, No. 11, pp. 1288–90, November 1995. Following the flip-chip bonding process the GaAs substrate is removed in order to allow operation in the 850 nano-meter wavelength regime, where the substrate would normally be absorbing or opaque to transmission, thus, the flip-chip bonding process provides accurate alignment between the optical devices and the VLSI circuits.

Although, the above references describe the attachment of optical modulators to CMOS circuits, those skilled in the art can utilize the techniques described therein to attach active optical sources, such as vertical cavity surface emitting lasers (VCSELs), micro-lasers, and the like, to CMOS circuits. Therefore, the flip-chip bonding technology that is available today, for example, a precision bonder made by Research Devices in Piscataway, N.J., can be used to manufacture the OE-VLSI interface chip.

In contrast with the prior art, the present invention shows that it is possible to provide a network interface device with a means for dynamically reconfiguring its port circuits. The present invention, by virtue of the integrated electronic switch, achieves port reconfigurability without physical rewiring or reconnections in the network infrastructure, as well as a rapid allocation of bandwidth according to an end-user's changing needs. Moreover, since end-user network interface cards (NICs) capable of multiple bit-rates are now available the capability for LAN interfaces to dynamically provide corresponding bit-rates to end-users on demand will be increasingly required in modern communication networks.

We claim:

1. A network interface device comprising:
    a plurality of optical ports for communicating optical signals with a network, said plurality of optical ports including a first optical port operating at a first optical signal data-rate and a second optical port operating at a second optical signal data-rate;
    a plurality of electronic circuits for providing end-user connections to said interface device; and
    an electronic switch between said plurality of ports and said plurality of electronic circuits, said electronic switch being responsive to an external control signal for dynamically reconfiguring an optical signal bandwidth connection to a selected one of said electronic circuits by changing the connection from a first optical port operating at a first optical signal data-rate to a second optical port operating at a second optical signal data-rate, wherein said network interface device is an integrated structure.

2. The interface device of claim 1 wherein said electronic circuits are encoder/decoder circuits.

3. The interface device of claim 2 wherein said electronic circuits further include Media-Access-Control circuits.

4. The interface device of claim 1 being an optoelectronic chip.

5. The interface device of claim 1 wherein said plurality of ports support at least at two different optical data-rates.

6. The interface device of claim 5 wherein each of said plurality of ports includes a vertical cavity surface-emitting laser.

7. The interface device of claim 1 further includes a means to optimize each of said plurality of ports corresponding to a bandwidth of said optical signal received from said network.

8. The apparatus of claim 1 wherein said electronic circuits are capable of receiving electrical signals that are selected from the group consisting of Ethernet, Fiber-channel, FDDI and ATM transmission protocols.

9. A network interface device for dynamic bandwidth allocation to an end-user connected to a network through said network interface device comprising:
    a plurality of optoelectronic transceivers for communicating with said network and for converting optical signals received from said network to electrical signals, wherein one of said plurality of optoelectronic transceivers supports a first optical data-rate and an other one of said plurality of optoelectronic transceivers supports a second optical data-rate;
    a plurality of electronic circuits for providing end-user connections to said interface device; and
    an electronic switch between said plurality of optoelectronic transceivers and said plurality of electronic circuits, said electronic switch being responsive to an external control signal for dynamically reconfiguring an optical signal bandwidth connection to a selected one of said electronic circuits by changing the connection from a first optoelectronic transceiver operating at a first optical signal data-rate to a second optoelectronic transceiver operating at a second optical signal data-rate, and wherein said network interface device is an integrated structure.

10. The device of claim 9 wherein each of said plurality of optoelectronic transceivers include a means for receiving an electrical signal from said switch and for converting said electrical signal to an optical signal and transmitting said optical signal to said network.

11. A method of reconfiguring connections between optical ports and electronic circuits of a network interface device comprising the steps of:
    responding to an external control signal controlling an optical signal bandwidth connection between an optical port and a selected one of said electronic circuits and
    dynamically reconfiguring said optical signal bandwidth connection to said selected one of said electronic circuits by changing a connection from a first optical port operating at a first optical signal data-rate to a second optical port operating at a second optical signal data-rate.

12. The method of claim 11 wherein said ports are optoelectric transceivers for communicating with a network and for converting optical signals received from said network to electric signals.

* * * * *